(12) United States Patent
Ibon

(10) Patent No.: US 9,079,627 B1
(45) Date of Patent: Jul. 14, 2015

(54) SCOOTER INCLUDING A THIRD REAR WHEEL TO ENABLE THE SCOOTER TO BE USED AS A WHEELIE

(71) Applicant: YVOLVE SPORTS LIMITED, Dublin (IE)

(72) Inventor: James W. Ibon, Canoga Park, CA (US)

(73) Assignee: YVOLVE SPORTS LIMITED, Dublin (IE)

( * ) Notice: Subject to any disclaimer, the term of this patent is extended or adjusted under 35 U.S.C. 154(b) by 58 days.

(21) Appl. No.: 13/789,364

(22) Filed: Mar. 7, 2013

Related U.S. Application Data

(60) Provisional application No. 61/608,588, filed on Mar. 8, 2012.

(51) Int. Cl.
    *B62M 1/00*     (2010.01)
    *B62K 3/00*     (2006.01)

(52) U.S. Cl.
    CPC ..................... *B62K 3/002* (2013.01)

(58) Field of Classification Search
    CPC ........ B62B 3/007; B62B 3/008; B62B 3/009; B62K 3/002; B62K 2202/00; A63C 17/004; A63C 17/008; A63C 17/0066; A63C 17/0073

USPC ............... 280/87.041, 87.021, 87.01, 87.043, 280/87.042, 767
See application file for complete search history.

(56) References Cited

U.S. PATENT DOCUMENTS

| | | | | |
|---|---|---|---|---|
| 4,095,817 | A * | 6/1978 | Cohen ..................... | 280/87.042 |
| 4,183,547 | A * | 1/1980 | Cohen et al. ............. | 280/87.042 |
| 5,090,716 | A * | 2/1992 | Borden .................... | 280/87.042 |
| 6,250,656 | B1 * | 6/2001 | Ibarra ....................... | 280/87.041 |
| 6,367,828 | B1 * | 4/2002 | Mandic .................... | 280/87.05 |
| 6,386,562 | B1 * | 5/2002 | Kuo ......................... | 280/87.042 |
| 6,619,678 | B2 | 9/2003 | van Ardenne | |
| 6,715,779 | B2 * | 4/2004 | Eschenbach ............. | 280/221 |
| 8,387,996 | B2 * | 3/2013 | Marcel .................... | 280/87.043 |
| 8,870,200 | B2 * | 10/2014 | Chen ....................... | 280/87.042 |
| 2002/0096849 | A1 * | 7/2002 | Bang ....................... | 280/87.041 |
| 2003/0024752 | A1 * | 2/2003 | Mayer et al. ............. | 280/755 |

* cited by examiner

Primary Examiner — James M Dolak

(57) ABSTRACT

The improvement of the invention is a permanent fixed or removable carriage for a third inline scooter wheel behind a second scooter wheel that allows the user to ride the scooter in an inclined position simulating a single wheel ride referred to as a "Wheelie" or a "Manual". The key is to place the third wheel within a range of 100 millimeters from the second wheel and a vertical distance variations of 25 millimeters to wheel enable a rider to achieve this Wheelie effect, where the angle of the scooter can be raised to twenty (20) and even to thirty (30) degrees.

10 Claims, 10 Drawing Sheets

SCOOTER INCLUDING A THIRD REAR WHEEL TO ENABLE THE SCOOTER TO BE USED AS A WHEELIE

This patent application claims priority to Application No. 61/608,588 filed on Mar. 8, 2012.

BACKGROUND OF THE INVENTION

1. Field of the Invention

The present invention relates to the field of scooters which are two-wheeled vehicles mounted under a horizontal platform, with the two wheels on axles to enable the scooter to rotate in a forward direction by a thrusting motion on the ground by one leg of the rider while a second leg rests on a portion of the horizontal platform. A vertical post or rod extends from a front location of the horizontal platform and a horizontal member is affixed at an upper location on the vertical post, the horizontal member functioning as a handle. Prior art scooters can transport the rider in a horizontal direction.

2. Description of the Prior Art

The following prior art references are relevant to the field of the present invention:
1. U.S. Pat. No. 5,090,716 issued to Borden on Feb. 25, 1992 for Extended Elevated Foot Platform (hereafter "Borden Patent")
2. U.S. Pat. No. 6,386,562 issued to Kuo on May 14, 2002 for Scooter Having Changeable Steering Mechanism (hereafter "Kuo Patent"); and
3. U.S. Pat. No. 6,619,678 issued to van Ardenne on Sep. 16, 2003 for Scooter (hereafter van Ardenne Patent").

The Borden Patent has three wheels with a third wheel extending at a remote distance behind the second wheel to provide additional stability to enable the scooter to be moved forward and from side to side.

The Kuo patent discloses a scooter has a pair of front wheels and pair of middle wheels to provide additional support and stability, and a third single wheel at a remote location behind the pair of second wheels.

The van Ardenne Patent discloses a conventional scooter with improvements in the steering post and handle.

None of the prior art patents can function as a wheelie.

SUMMARY OF THE PRESENT INVENTION

The present invention relates to the field of scooters. As with most scooters, the present invention has the basic elements which include two-wheeled vehicles mounted under a horizontal platform, with the two wheels on axles to enable the scooter to rotate in a forward direction by a thrusting motion on the ground by one of the rider's legs while a second leg rests on a portion of the horizontal platform. A vertical post or rod extends from a front location of the horizontal platform and a horizontal member is affixed at an upper location on the vertical post, the horizontal member functioning as a handle. Prior art scooters can transport the rider in a horizontal direction.

The improvement of the present invention comprises a permanent fixed or removable carriage for a third inline scooter wheel that allows the user to ride the scooter in an inclined position simulating a single wheel ride referred to as a "Wheelie" or a "Manual". By having this third inline wheel in a particular position promotes a stabile ride otherwise difficult to achieve with a single rear wheel. Also, the placement of the wheel 100 millimeters from the second wheel is necessary in order for the device to function appropriately as a wheelie.

In addition, the third wheel can be adjusted fore and aft as well as up and down by a varied vertical distance of 25 millimeters to achieve various degrees of incline, allowing the user to start from a moderate position and then achieve various degrees of greater angles of incline.

The key is to place the third wheel within a range of 100 millimeters from the second wheel. An additional key is having a vertical range of 25 millimeters between axles to enable a rider to achieve this Wheelie effect, where the angle of the scooter can be raised from twenty (20) degrees when the axle is in the lower opening to thirty (30) degrees when the axle is in the upper opening.

It is therefore an object of the present invention to provide a third wheel after the second wheel on a scooter so that the third wheel in conjunction with the second wheel enables the scooter to be lifted off the ground and elevated from 20 degrees to 30 degrees to enable the rider to perform a wheelie.

It is also an object of the present invention to enable the third wheel to be adjusted in various ways to facilitate the incline of the scooter and enable a rider to perform a wheelie.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
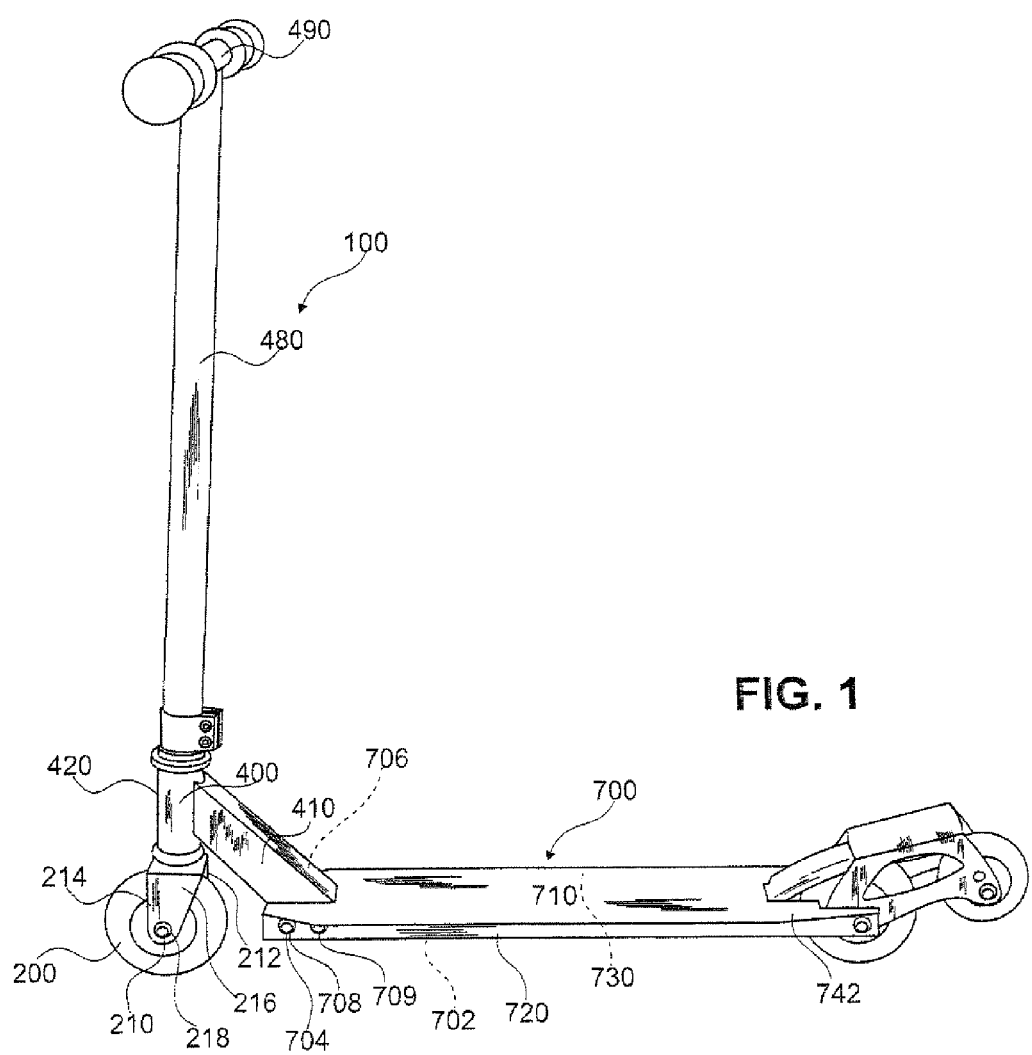
FIG. 1 is a side elevational view of a scooter incorporating a mockup including the present invention third wheel behind the second wheel.
Figure 2:
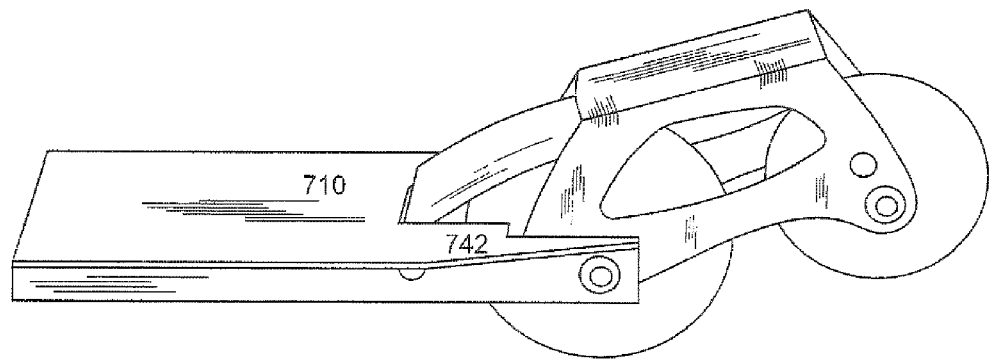
FIG. 2 is a closeup view of the rear section depicted in FIG. 1 illustrating the third wheel adjacent the second wheel of the scooter.
Figure 3:
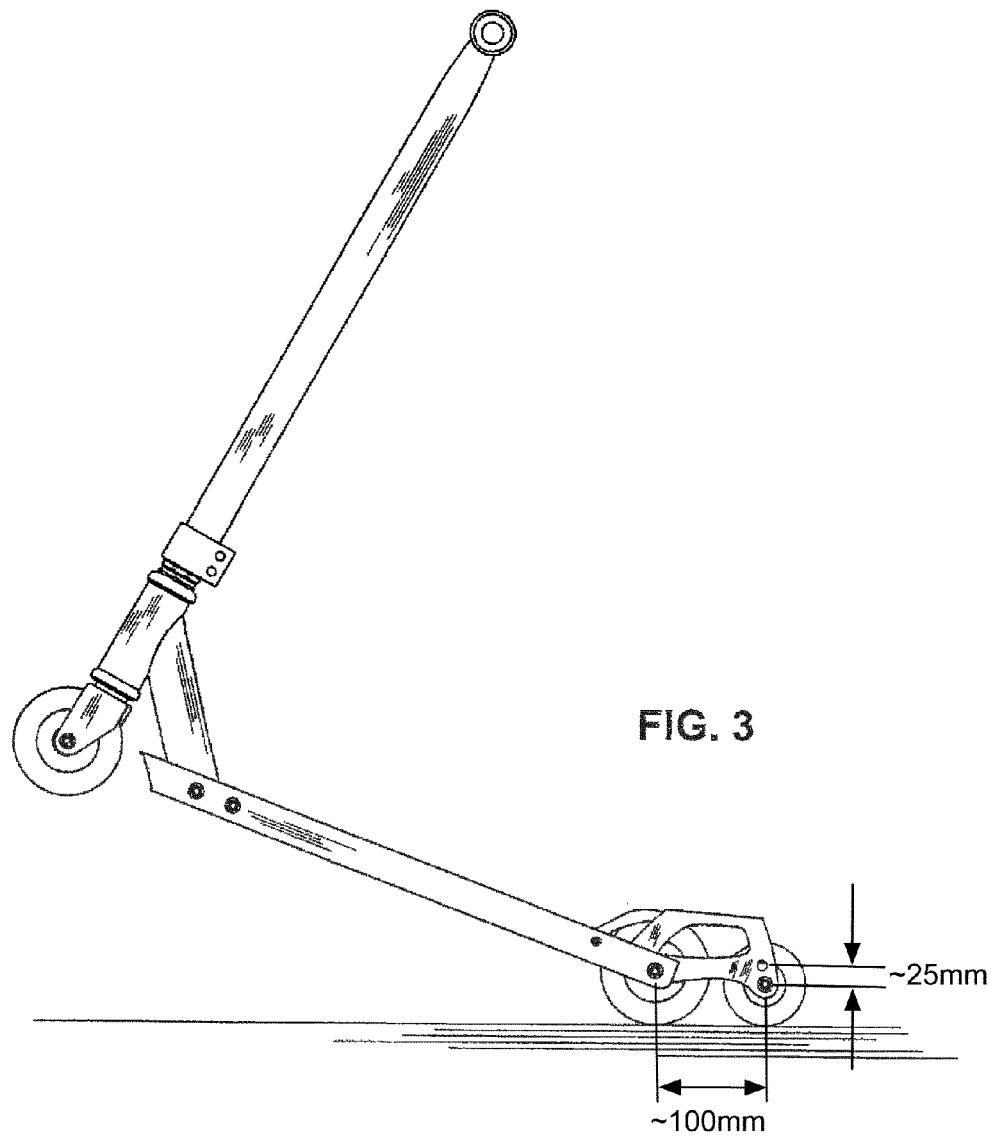
FIG. 3 is a side elevational view of the scooter depicted in FIG. 1 with the scooter raised in an elevated wheelie position.

Referring to FIG. 1, a scooter 100 is illustrated and discloses a first wheel 200 mounted by an axle 210 to an attaching mechanism 212 having a pair of oppositely disposed walls 214 and 216 each respectively including oppositely disposed openings (not shown) and 218 through which the axle 210 is affixed. Affixed to the attaching mechanism 212 is a lower pole 400 having an attaching mechanism 410 affixed at a first end 420 to lower pole 400. Lower pole 400 is attached to upper pole 480 which is attached to transverse handle 490.

The scooter 100 has a flat board 700 with a flap top surface 710 and a pair of sidewalls 720 and 730. Adjacent the front end 702 of the flat board 700 are a pair of parallel openings 704 and 706 in sidewalls 720 and 730 through which are threaded mating bolts 708 and 709 extending through parallel openings in a lower end (not shown) of attaching mechanism 410 and having parallel openings through which attaching bolts 708 and 709 extend through openings 704 and 706 in sidewalls 720, 730 and are each closed with a respective locking washer.

Figure 10:
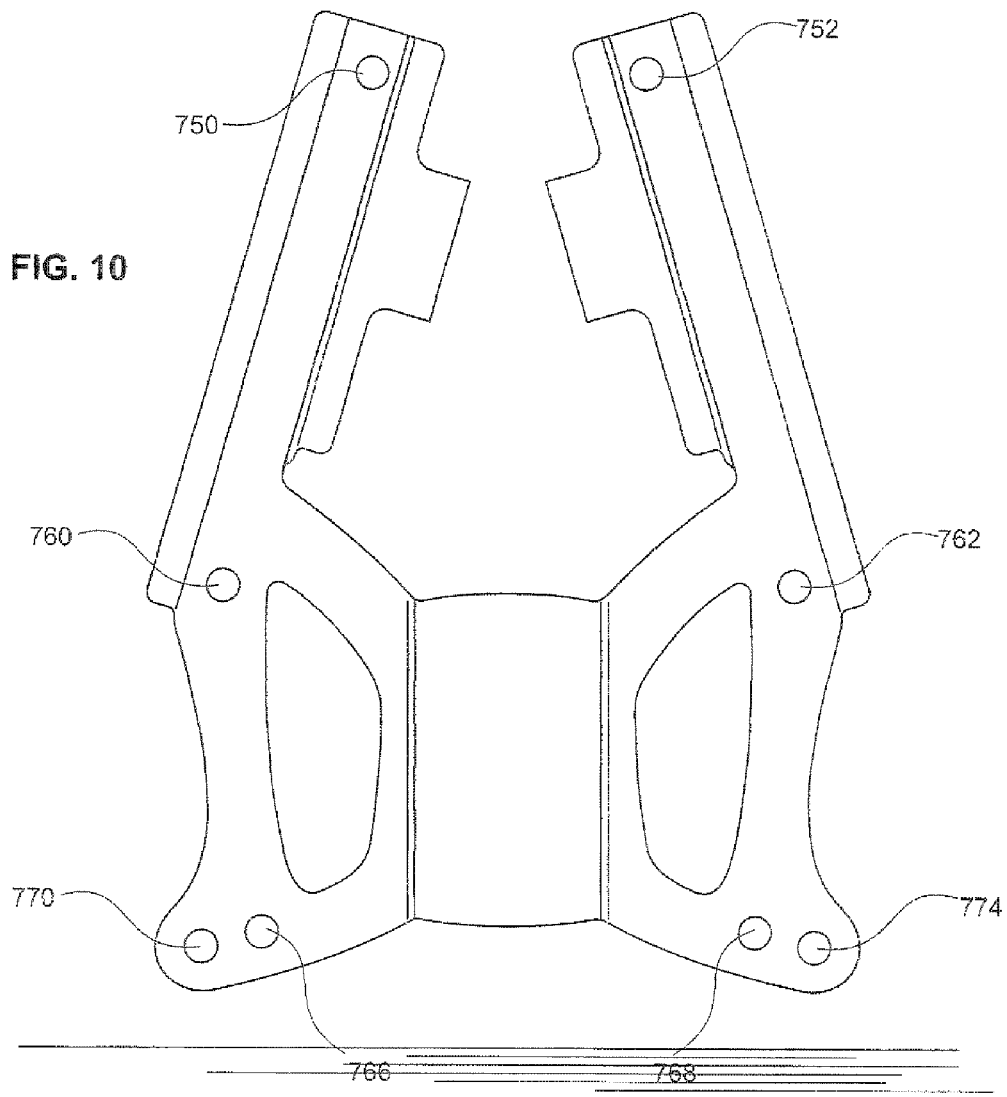
FIG. 10 is a drawing of the second and third wheel retaining apparatus before it is affixed to the rear section of the scooter.

Referring to FIGS. 4-9, adjacent the rear end 742 of flat board 710 is an attaching member 780 having a pair of parallel spaced apart openings 750, 752, 760, 762, and 770 and 772. The rear section of the sidewalls 720 and 730 contain corresponding openings 786 and 792 through which a rear bolt 791 extends to connect the rear section 780 to the rear portion 742 of the flat board. The unclosed attaching member 780 is illustrated in FIG. 10. The rear section 742 has its parallel walls 720 and 730 each having a parallel opening 786 and 790 through which a fastening bolt extends through openings 750, 736, 790 and 752. As illustrated in FIGS. 2, 3, 4, 5 and 6, the attaching member 780 extends at an angle to board second end 742.

Figure 4:
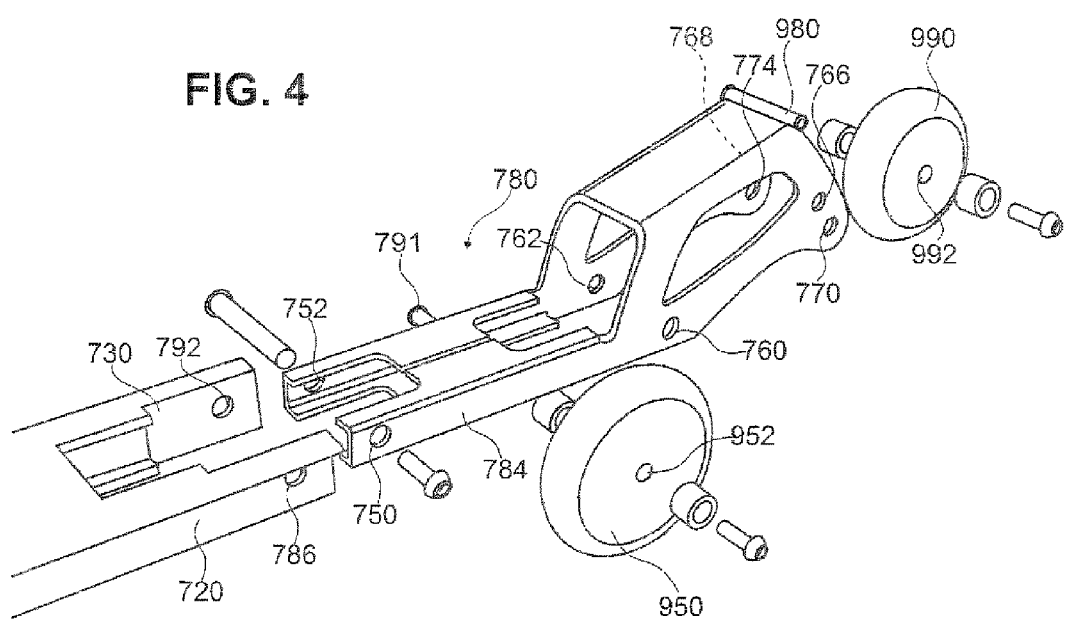
FIG. 4 is an exploded drawing showing the rear section and the rear portion of the frame of the scooter body.
Figure 5:
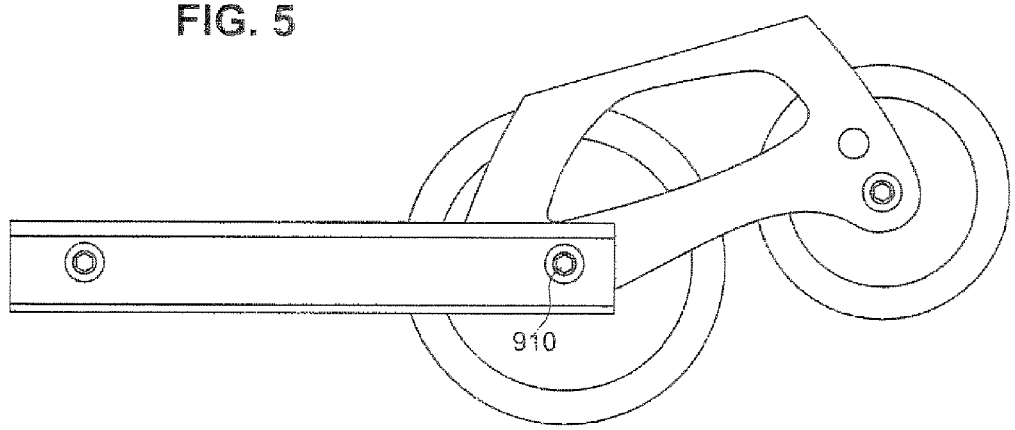
FIG. 5 is a rear perspective drawing showing the two rear wheels in their position on the attachment mechanism.
Figure 6:
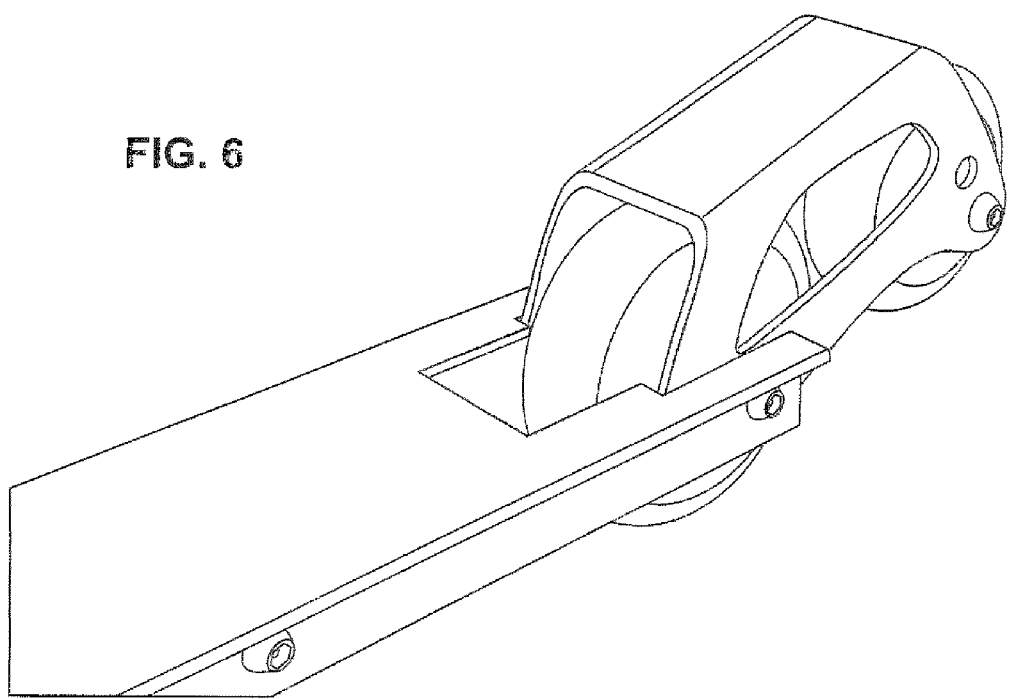
FIG. 6 is a side perspective view showing the two rear wheels on the attachment mechanism.
Figure 7:
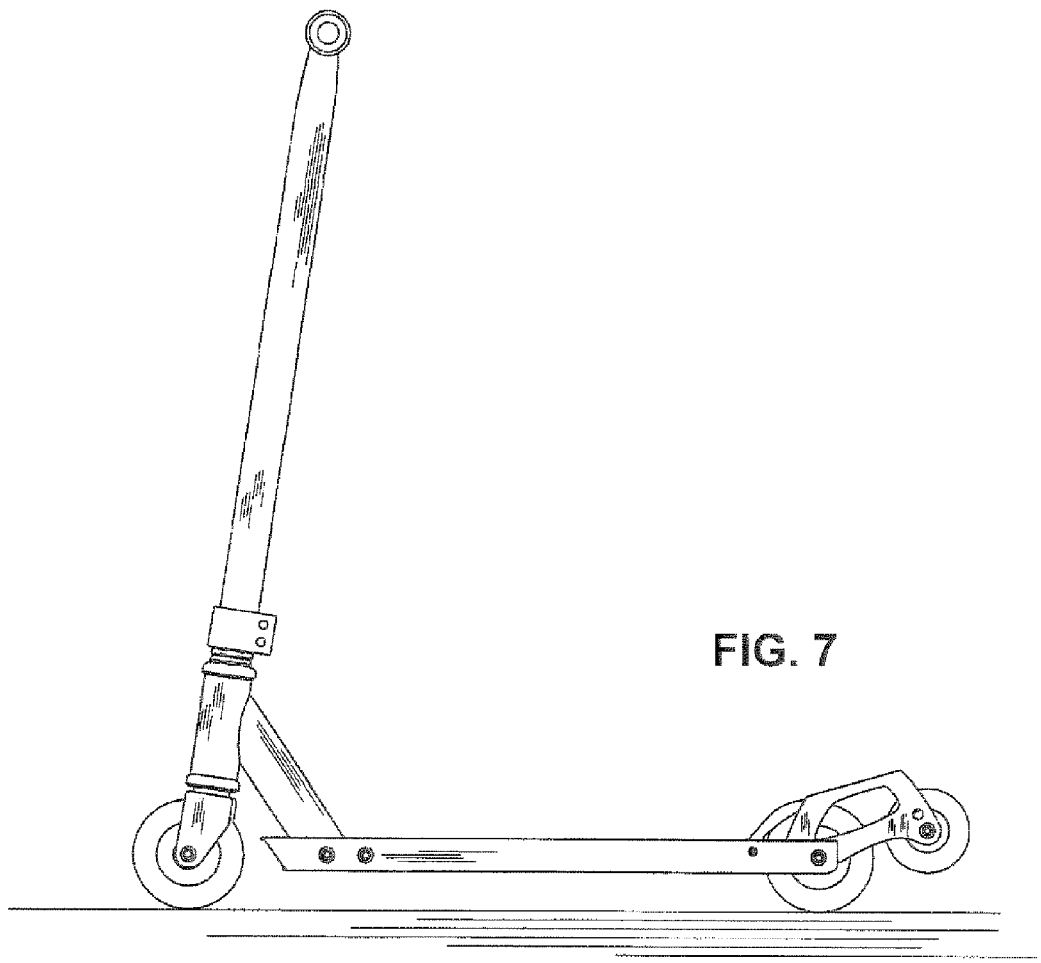
FIG. 7 is a side elevational drawing of a scooter incorporating the present invention third wheel at a standard horizontal position on the ground.
Figure 8:
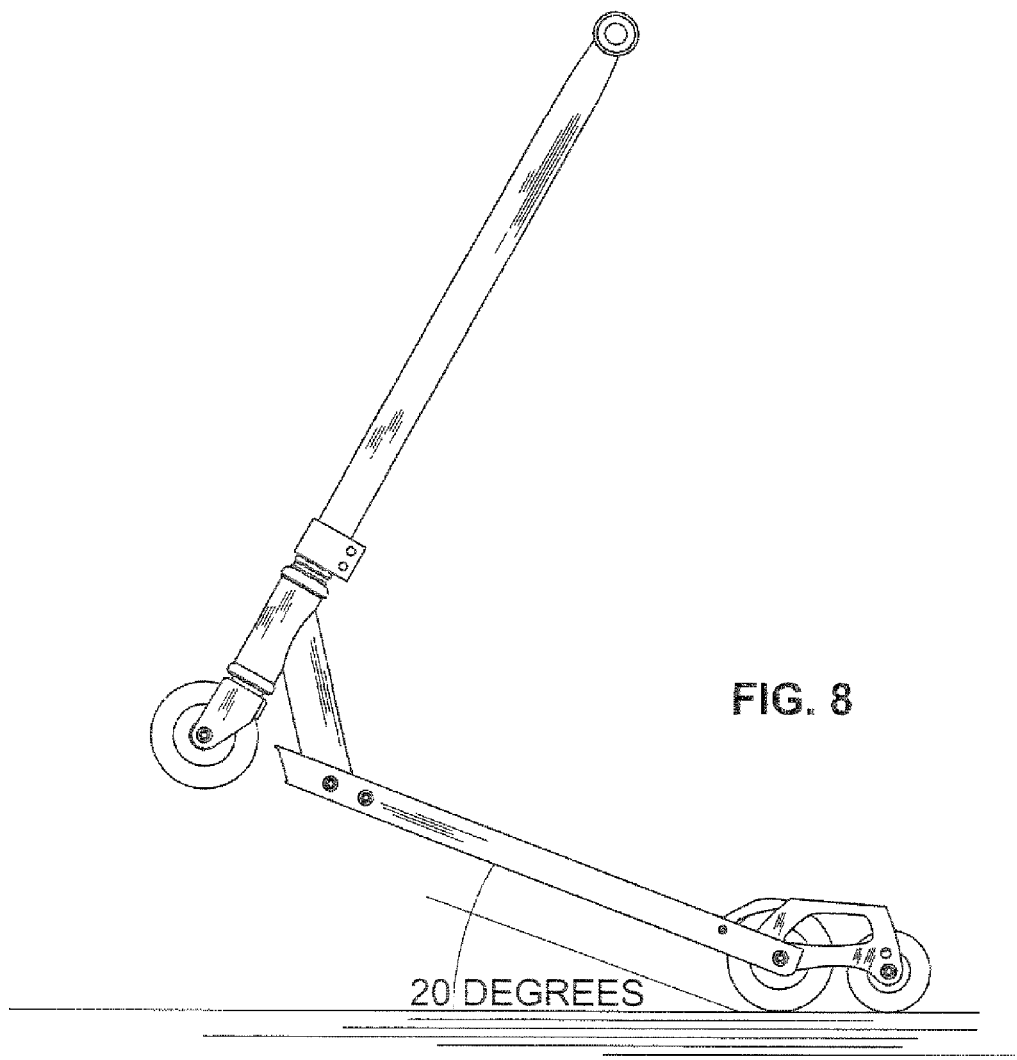
FIG. 8 is a side elevational drawing of a scooter incorporating the present invention third wheel, with the scooter elevated at a twenty (20) degree angle off the ground in a wheelie position.
Figure 9:
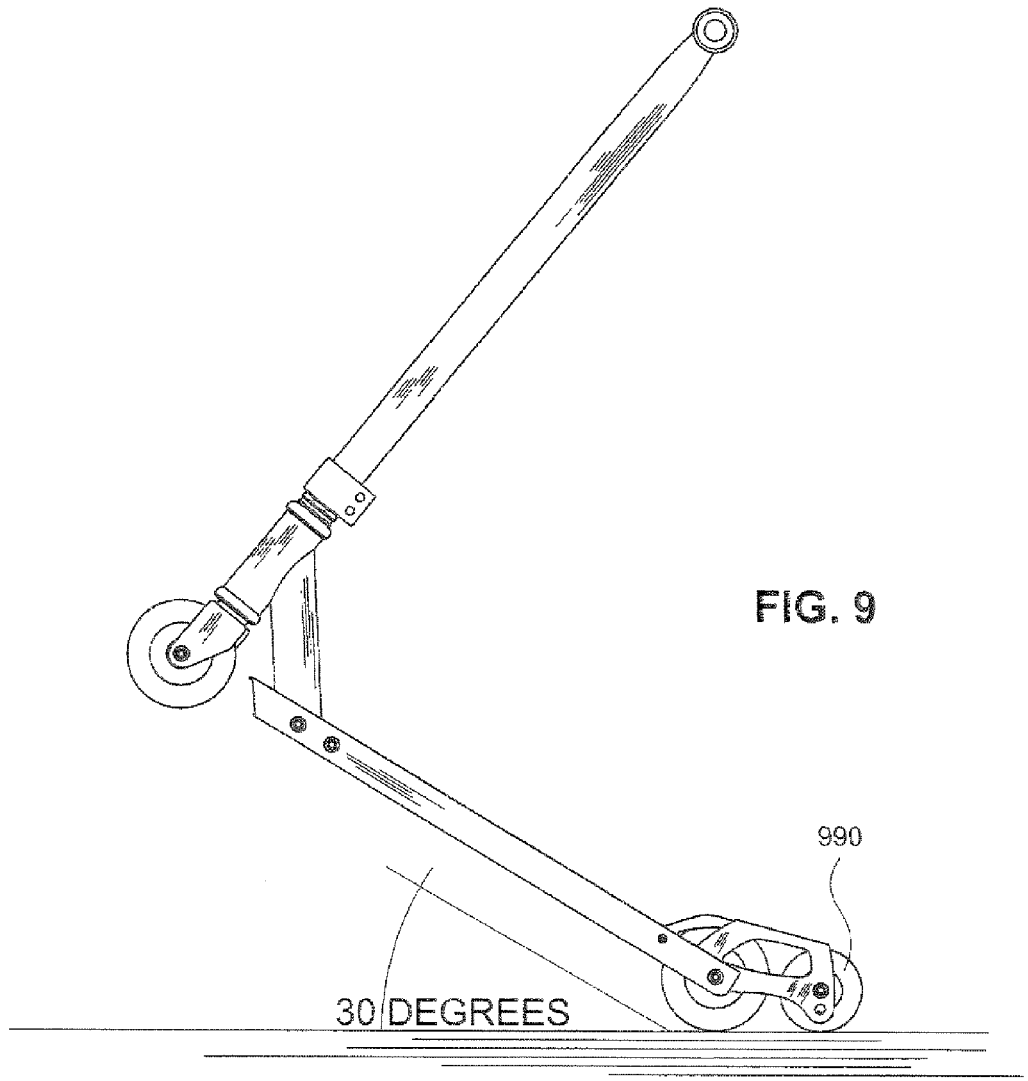
FIG. 9 is a side elevational drawing of a scooter incorporating the present invention third wheel, with the scooter elevated at a thirty degree angle off the ground in a wheelie position.

As illustrated in FIGS. 4, 5 and 6, extending through openings 760 and 762 is second axle 910 extending through opening 952 of second wheel 950. The rear portion of attaching member 780 has two vertically spaced apart openings, lower openings 770 and 774 and upper openings 966 and 968. As illustrated in FIGS. 4, 8, 90 and 10, axle 980 extends through lower openings 770 and 774 and opening 992 in third wheel 990 so that the angle of the wheelie is 20 degrees. When axle 980 extends through upper openings 766 and 768 and opening 992 through wheel 990, the angle of the wheelie is 30 degrees.

The horizontal distance between opening 760 and either opening 766 or 770 is approximately 100 millimeters. Similarly, the horizontal distance between opening 762 and either opening 768 or 774 is approximately 100 millimeters. The distance between openings 766 and 770 is approximately 25 millimeters and the distance between opening 768 and 774 is approximately 25 millimeters.

The attachment member 780 can also be used as a replacement part on existing two-wheeled scooters. The axle retaining a second wheel 750 is removed and replaced with the attaching member 780 so that second wheel 750 is retained by axle 910 as described and the third wheel is retained as previously described, with the dimensions of the openings in the attaching member 780 as previously described.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A scooter, comprising:
   a. a first wheel mounted by a first wheel axle to an attaching mechanism having a pair of oppositely disposed walls, each oppositely disposed wall respectively including oppositely disposed openings through which the first wheel axle is affixed to an attaching mechanism affixed to a lower end of a pole, the pole having an upper end attached to a transverse handle;
   b. a flat board with a flat top surface and a pair of oppositely disposed parallel sidewalls, an attaching mechanism attaching a lower end of the pole to the flat top surface adjacent a front end of the flat top surface;
   c. a receiving member adjacent a rear end of the flat board and configured to removably receive an attaching member, the oppositely disposed sidewalls of the scooter having openings aligned with openings in a pair of oppositely disposed sidewalls in the attaching member to receive a second wheel axle supporting a second wheel, the second wheel axle extending through the aligned openings in the scooter and attaching member, the attaching member extending at an upwardly extending angle relative to the rear end of the flat board; and
   wherein a rear portion of the attaching member has two vertically spaced apart openings, a lower pair of openings and an upper pair of spaced apart openings, a third wheel axle extends through an opening in a third wheel and also removably extends through and is removably affixed to the lower pair of openings so that an angle of the third wheel relative to the second wheel is approximately 20 degrees and when the third wheel axle which extends through the opening in the third wheel removably extends through and is removably affixed to the upper pair of openings in the attaching member, the third wheel is at an angle of approximately 30 degrees relative to the second wheel,
   wherein in both of the lower and upper pairs of openings, the third wheel is approximately the same horizontal distance behind the second wheel.

2. A scooter, comprising:
   a. a footboard;
   b. a first wheel supported on a first wheel axle, rotatably mounted to a pole that is pivotable relative to a front end of the footboard, the pole having a handle;
   c. a second wheel supported on a second wheel axle proximate a rear end of the footboard;
   d. an attaching member removably mountable to the second wheel axle, wherein the attaching member has a lower mounting arrangement and an upper mounting arrangement; and
   e. a third wheel that is removably mountable to each of the lower and upper mounting arrangements,
   wherein in both of the upper and lower mounting arrangement positions, the third wheel is approximately the same horizontal distance behind the second wheel.

3. The scooter in accordance with claim 2, further comprising
   the distance between the lower pair of openings and the upper pair of openings at the rear portion of the attaching member is approximately 25 millimeters.

4. A scooter having a first wheel and a second wheel that is rearward of the first wheel and a flat board, comprising:

a carriage that holds a third wheel behind the second wheel, which allows the user to ride the scooter in an inclined position in which the second and third wheels support the scooter on a ground surface; and wherein the third wheel is adjustable in a vertical direction, between a first position and a second position having a vertical distance of approximately 25 millimeters from the first position, such that, the scooter is supportable on the second and third wheels with the flat board at a plurality of angles based on which of the first position and the second positions the third wheel is in, wherein in both of the first and second positions, the third wheel is approximately the same horizontal distance behind the second wheel.

5. The scooter in accordance with claim 4, further comprising wherein said carriage is removably affixed to said flat board.

6. The scooter in accordance with claim 2, further comprising the horizontal distance between the location of the second wheel axle and the location of the axle of the third wheel is approximately 100 millimeters.

7. The scooter in accordance with claim 2, wherein the third wheel is mounted to a third wheel axle, and wherein each of the upper and lower mounting arrangements includes a pair of openings in the attaching member, which are configured to removably receive the third wheel axle.

8. The scooter in accordance with claim 2, wherein, when the third wheel is mounted in the lower mounting arrangement and the scooter is upright with the second and third wheels resting on a flat surface, the foot board is at approximately 20 degrees relative to the flat surface, and when the third wheel is mounted in the upper mounting arrangement and the scooter is upright with the second and third wheels resting on the flat surface, the foot board is at approximately 30 degrees relative to the flat surface.

9. The scooter in accordance with claim 2, wherein in both of the upper and lower mounting arrangement positions, the third wheel is approximately 100 mm behind the second wheel.

10. The scooter in accordance with claim 4, wherein in both of the first and second positions, the third wheel is approximately 100 mm behind the second wheel.

* * * * *